United States Patent
Fischer

(10) Patent No.: US 8,764,051 B2
(45) Date of Patent: Jul. 1, 2014

(54) FASTENING DEVICE, AND FASTENING SUBASSEMBLY FOR FASTENING A GAS GENERATOR, AND VEHICLE OCCUPANT RESTRAINT SYSTEM

(75) Inventor: Anton Fischer, Schechingen-Leinweiler (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/990,069

(22) PCT Filed: Aug. 11, 2011

(86) PCT No.: PCT/EP2011/004034
§ 371 (c)(1),
(2), (4) Date: Jun. 27, 2013

(87) PCT Pub. No.: WO2012/072152
PCT Pub. Date: Jun. 7, 2012

(65) Prior Publication Data
US 2013/0264802 A1    Oct. 10, 2013

(30) Foreign Application Priority Data
Nov. 30, 2010 (DE) .......................... 10 2010 052 781

(51) Int. Cl.
*B60R 21/16* (2006.01)

(52) U.S. Cl.
USPC ....................................................... 280/728.2

(58) Field of Classification Search
USPC ........................................... 280/728.2, 730.2
See application file for complete search history.

(56) References Cited

U.S. PATENT DOCUMENTS

| 6,176,511 | B1 | 1/2001 | Adkisson et al. | |
| 6,783,148 | B2* | 8/2004 | Henderson | 280/728.2 |
| 6,837,513 | B2* | 1/2005 | Oka et al. | 280/728.2 |
| 7,699,340 | B2* | 4/2010 | Okuhara et al. | 280/728.2 |
| 8,007,000 | B2* | 8/2011 | Gammill et al. | 280/730.2 |
| 2004/0090049 | A1 | 5/2004 | McCann et al. | |
| 2009/0039627 | A1* | 2/2009 | Yokota | 280/730.2 |
| 2010/0244412 | A1 | 9/2010 | Yamashita | |

FOREIGN PATENT DOCUMENTS

| DE | 10 2009 015 337 | 9/2010 |
| WO | 2008/045300 | 4/2008 |

\* cited by examiner

*Primary Examiner* — Faye M. Fleming
(74) *Attorney, Agent, or Firm* — Tarolli, Sundheim, Covell & Tummino LLP

(57) ABSTRACT

The invention relates to a fastening device (16) for a preferably tubular inflator (14) on a vehicle part (18), including a holder component (20) to which the inflator (14) can be fastened. The holder component (20) includes a first fastening element (22) and a second fastening element (24) offset in the axial direction (A) for fastening on the vehicle part (18). The holder component (20) includes a lever support (30) adapted to be in contact with the vehicle part (18) and being arranged in the axial direction (A) between the first and second fastening elements (22, 24) and separating the holder component (20) into a first lever arm (32) and a second lever arm (34). The invention further includes a fastening assembly (38) including an inflator (14) and a fastening device (16), the first fastening element (22) includes a hook (26) formed by a nut (50) screwed onto a threaded bolt (48) of the inflator (14) having a head portion (52) and a tapered neck portion (54) allowing a positive connection to the vehicle part (18).

14 Claims, 2 Drawing Sheets

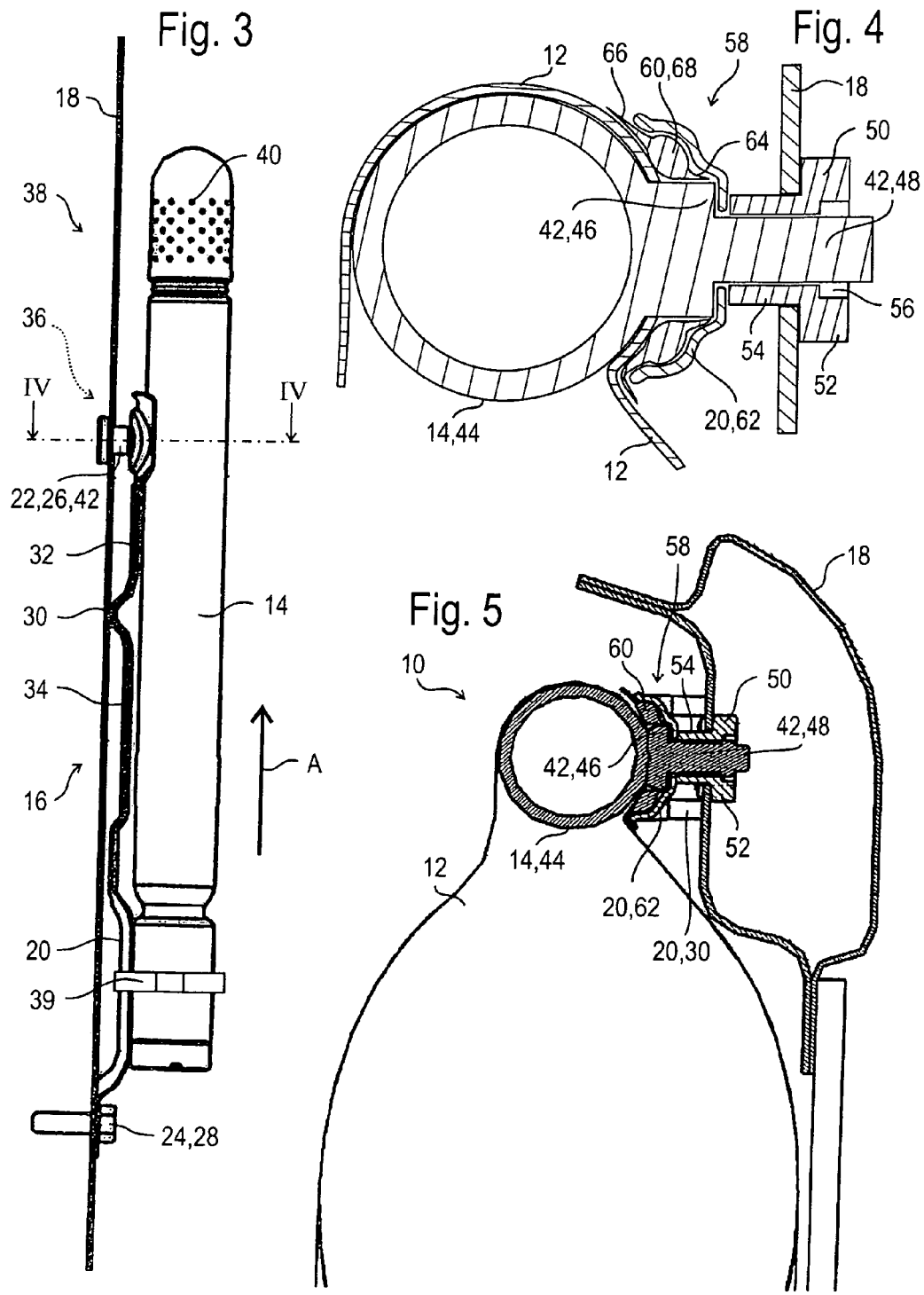

FASTENING DEVICE, AND FASTENING SUBASSEMBLY FOR FASTENING A GAS GENERATOR, AND VEHICLE OCCUPANT RESTRAINT SYSTEM

RELATED APPLICATIONS

This application corresponds to PCT/EP2011/004034, filed Aug. 11, 2011, which claims the benefit of German Application No. 10 2010 052 781.5, filed Nov. 30, 2010, the subject matter of which are incorporated herein by reference in their entirety.

BACKGROUND OF THE INVENTION

The invention relates to a fastening device for a preferably tubular inflator on a vehicle part comprising a holder component to which the inflator can be fastened and which, for fastening on the vehicle part, includes a first fastening element and a second fastening element offset in axial direction as well as a fastening assembly comprising an inflator and such fastening device as well as a vehicle occupant restraint system.

From the state of the art vehicle occupant restraint systems comprising tubular inflators are known in which the inflator is fastened to a holder component which in turn is locked on a vehicle part. The load transmission from the inflator to the vehicle part takes place via the holder component that has to have an appropriately stable design. In order to obtain good load transmission the fastening elements are formed to be as rigid as possible, with only small manufacturing tolerances being possible.

SUMMARY OF THE INVENTION

It is the object of the invention to provide a fastening for an inflator on a vehicle part allowing to compensate for manufacturing tolerances and to design the fastening device in a compact manner having low weight.

This object is achieved, according to the invention, by a generic fastening device, the holder component having a lever support adapted to contact the vehicle part and being arranged in the axial direction between the first and second fastening elements and separating the holder component into a first lever arm and a second lever arm. In this way load transmission between the first and second fastening elements is enabled via the lever support and a bias of the fastening device which can be used, for example, to compensate for manufacturing tolerances. A lever support is a type of rocker bearing of a rocker from which the lever arms extend.

In the mounting condition, for example, the first fastening element can be biased at the first lever arm via the lever support by the second fastening element at the second lever arm and/or the second fastening element can be biased at the second lever arm via the lever support by the first fastening element at the first lever arm.

It is also possible that the holder component is configured to be at least partly elastic and is elastically biased in the mounting condition by the first and/or second fastening element.

The holder part preferably is made of a formed sheet metal. In this way a simple and inexpensive manufacture of the holder member is possible.

The first fastening element can be in the form of a hook allowing a positive connection to the vehicle part. The biasing of the first fastening element by the lever support can compensate for manufacturing tolerances and thus prevent, for instance, rattling of the connection in the mounting condition.

The second fastening element can be a screwed connection. A screwed connection permits biasing the holder component in a simple manner.

The invention further relates to a fastening assembly for fastening an inflator on a vehicle part comprising an inflator and an afore-described fastening device, the first fastening element comprising a hook formed by a nut screwed onto a threaded bolt of the inflator and having a head portion and a tapered neck portion which permits a positive connection to the vehicle part. By screwing the nut onto the threaded bolt the hook can be formed in a simple way. The load is transmitted via the threaded bolt directly between the inflator and the vehicle part. In this way, the load of the holder component is reduced, thereby allowing especially a light and compact design of the holder component.

Preferably the nut is T-shaped and comprises the head portion and the tapered neck portion. The hook shape is formed completely by the nut; thus in particular the thread at the threaded bolt is spared by the neck portion of the nut.

The threaded bolt can project through an opening of the holder component and the holder component can be loaded against the inflator by the neck portion of the T-shaped nut, whereby a fixed connection and an exact positioning of the holder component at the threaded bolt of the inflator are enabled.

Gas exit from the vehicle occupant restraint system in the area of the fastening device can be reduced by providing a sealing between the holder component and the inflator.

The sealing can be loaded especially by biasing the holder component against the inflator.

Preferably the hook is formed so as to be adapted to be introduced into a keyhole-type opening in the vehicle part having a wide opening area and a tapered opening area, the maximum outer radius of the head portion being smaller than or equal to the radius of the wide opening area and larger than or equal to the radius of the tapered opening area and the radius of the neck portion being smaller than or equal to the radius of the tapered opening area. In this way the hook can be fastened especially to the wall areas of the vehicle part in which the rear side of the wall area is not accessible.

Preferably the threaded bolt is arranged in the area of the discharge orifices of the inflator. When activating the inflator, the load of the fastening assembly is highest in the area of the discharge orifices of the inflator. This load can be transmitted via the threaded bolt directly to the vehicle part, thereby the load of the holder component being relatively low.

The nut may include an internal gearing. In this way, the radially outer surface of the nut constituting the hook can be formed without any gearing and a free shaping of the head portion of the nut is enabled.

Furthermore, the invention relates to a vehicle occupant restraint system comprising an inflator and an airbag as well as an afore-described fastening device and/or an afore-described fastening assembly.

BRIEF DESCRIPTION OF THE DRAWINGS

Further features and advantages of the invention are evident from the following description and from the following drawings which are referred to. The drawings show in:

FIG. 3 the inflator according to FIG. 1 in a fastening assembly according to the invention;

FIG. 4 a sectional view of the fastening extension and the sealing assembly of a fastening assembly according to the invention along the sectional plane IV-IV in FIG. 3; and FIG. 5 a sectional view of the vehicle occupant restraint system according to FIG. 1 along the sectional plane IV-IV in FIG. 3.

DESCRIPTION

Figure 1:
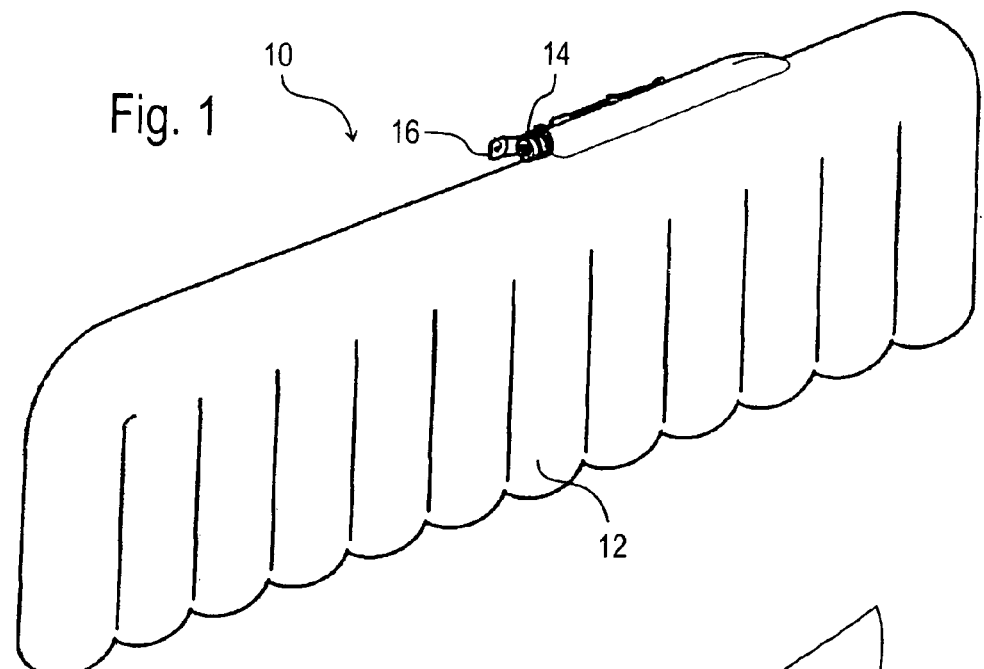
FIG. 1 a vehicle occupant restraint system according to the invention for a vehicle comprising an inflator and an airbag.

FIG. 1 shows a vehicle occupant restraint system 10 comprising an airbag 12, here a lateral head airbag fastened to the roof frame, and an inflator 14. The inflator 14 is fastened to a vehicle part 18, viz. the roof frame, by a fastening device 16. Although in the illustrated embodiment the vehicle occupant restraint system 10 is in the form of a lateral head airbag, also other modes of the vehicle occupant restraint system can be provided, however.

Figure 2:
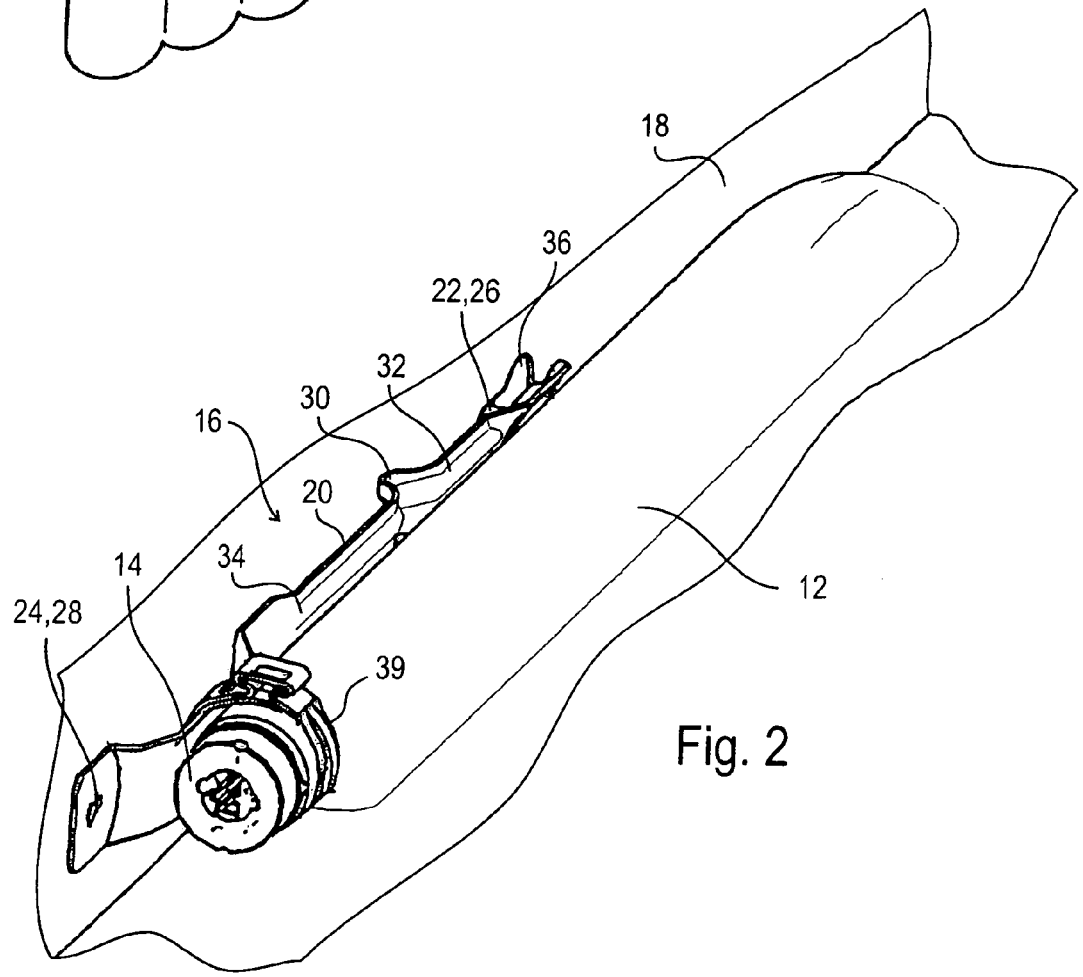
FIG. 2 a detailed view of the vehicle occupant restraint system according to FIG. 1 comprising a fastening device according to the invention.

The fastening device 16 shown in FIG. 2 and FIG. 3 includes an elongate holder component 20 having a first fastening element 22 and a second fastening element 24 offset in the axial direction A for fastening on the vehicle part 18.

In the shown embodiment the first fastening element 22 is in the form of a hook 26 and the second fastening element 24 is in the form of a screwed connection 28.

The holder component 20 has a lever support 30 which is adjacent to the vehicle part 18 and parts the holder component 20 into a first lever arm 32 including the first fastening element 22 and a second lever arm 34 including the second fastening element 24.

The lever support 30 is sort of a rocker bearing by which the holder component is adjacent especially loosely to the vehicle part 18.

In the shown embodiment the holder part 20 is made of a formed sheet metal in which the lever support 30 is constituted by an extension created by forming.

The hook 26 is positively connected to the vehicle part 18 in a keyhole-type orifice 26.

FIG. 3 illustrates the inflator without an airbag. The inflator 14 and the fastening device 16 jointly constitute a fastening assembly 38 of the vehicle occupant restraint system.

The inflator 14 is tubular and is connected at one end, viz. in the area of the electrical connection, to the holder component 20 via a clamp 39.

The clamp 39 also serves for fastening the airbag 12 on the inflator 14, the airbag 12 being clamped between the clamp 39 and the inflator 14.

At the other end of the inflator 14 in the area of the discharge orifices 40, the inflator 14 is connected to the holder component 20 and the vehicle part 18 via a fastening extension 42 which is part of the first fastening element 22.

As is clearly visible in FIG. 3, the holder component 20 contacts the vehicle part 18 via three points, the first fastening element 22, the second fastening element 24 and the lever support 30 being connected to the vehicle part 18.

The first fastening element 22 in the form of the hook 26 is biased via the lever support 30, thereby the hook 26 being tightly adjacent to the vehicle part 18. This biasing is generated by the second fastening element 24, for the associated screw forces the associated lever arm clockwise related to FIG. 3 by virtue of the rocker bearing forming the lever support 30. Thus force is applied equally clockwise to the lever and the latter presses to the right. In the shown embodiment, the holder component 20 is formed to be partly elastic and is bent slightly elastically. When fastening the second fastening element, i.e. when screwing on the screwed connection 28, the holder component 20 is thus biased and via the lever support 30 applies a force against the vehicle part 18 to the hook 26.

Alternatively the holder component 20 can be substantially rigid and the first and second fastening elements 22, 24 can be mutually biased via the lever support 30.

FIG. 4 illustrates a section across the vehicle occupant restraint system 10 in the area of the first fastening element 22.

At the housing 44 of the inflator 14 a fastening extension 42 having a fastening base 46 and a threaded bolt 48 is provided. The fastening extension 42 protrudes through an orifice in the airbag 12.

A nut 50 forming the hook 26 of the first fastening element 22 is screwed onto the threaded bolt 48.

The hook 26 includes a wide head portion 52 and a tapered neck portion 54. The head portion 52 is dimensioned so that the maximum outer radius of the head portion 52 is smaller than or equal to the radius of the wide opening area of the keyhole-type opening 36 in the vehicle part 18 and larger than or equal to the radius of the tapered opening area of the keyhole-type opening 36. The neck portion 54 is dimensioned so that the radius of the neck portion 54 is smaller than or equal to the radius of the tapered opening area of the keyhole-type opening 36. In this way, the head portion 52 of the hook 26 can be introduced into the wide opening area and subsequently the neck portion 54 of the hook 26 can be inserted in the tapered opening area so as to form a positive connection.

In the shown embodiment the head and neck portions 52, 54 of the hook 26 are formed by a T-shaped nut 50.

It is also possible to design the hook 26 in that the threaded bolt 48 constitutes the tapered neck portion 54 of the hook 26 and the screwed-on nut 50 merely forms the head portion 52.

The nut 50 includes in internal gearing 56 for being rotationally driven. The internal gearing 56 thus is independent of the design of the radially outer surface of the head portion 52.

The threaded bolt 48 of the fastening extension also protrudes through an opening in the holder component 20. The holder component 20 is directly adjacent to the fastening base 46 of the fastening extension 42 and is loaded against the fastening base 46 by the neck portion 54 of the T-shaped nut 50. The holder component 20 is thus fixedly connected directly to the inflator 14.

Upon igniting the inflator 14 in the case of release of the vehicle occupant restraint system 10, high forces are formed in the area of the gas discharge orifices 40 and thus in the area of the first fastening element 22.

The load of the first fastening element 22 is transmitted substantially directly to the vehicle part 18 via the fastening extension 42 of the inflator 14. The holder component 20 is loaded only slightly in the area of the first fastening element 22 and is designed to be light-weight.

The fastening assembly 38 comprises a sealing assembly 58 including a sealing element 60 and a flange member 62. The sealing assembly 58 serves for clamping the airbag 12 against the inflator 14 and for sealing the opening of the airbag 12 at the fastening extension 42.

The flange member 62 is formed by the holder component 20 and extends groove-shaped in the area of the fastening extension 42 so as to partly surround the toroidal outer wall of the inflator.

The sealing element 60 is loaded by the flange component 62 in the direction of the outer wall of the inflator, the sealing element 60 clamping the airbag 12 against the inflator 14 and sealing the opening in the airbag 12.

The sealing element 60 has an integrally formed centering extension 64 by which it is adjacent to the fastening extension 42 of the inflator. The centering extension 64 ensures correct positioning of the sealing element 60 when mounting the vehicle occupant restraint system 10.

The sealing element 60 further includes a laterally radially outwardly protruding extension 66 that protrudes from the flange member 62. The extension 66 on the one hand improves the sealing and clamping function of the sealing element 60 and, on the other hand, allows simple control as to whether the sealing element 60 is present and is correctly positioned.

FIG. 5 illustrates a further sectional view of the vehicle occupant restraint system 10. The fastening extension 42 is welded to the inflator 14 in this embodiment.

In this embodiment the vehicle part 18 is a hollow part. In this embodiment the fastening extension 42 including the screwed-on nut 50 is introduced into the wide opening area of the keyhole-type opening 36. After that, the fastening assembly 38 including the inflator 14 and the fastening device 16 is displaced in the axial direction, the hook 26 with the neck portion 54 being pushed into the tapered opening area of the keyhole-type opening 36, whereby a positive connection is formed.

In this position the fastening device is locked in the axial direction via the second fastening element 24 in the form of a screwed connection 28 and the hook 26 is biased via the lever support 30 and with the head portion 52 is adjacent to the wall of the vehicle part 18.

The invention claimed is:

1. A fastening device (16) for a tubular inflator (14) on a vehicle part (18), comprising a holder component (20) for holding and securing the inflator (14) to the vehicle part (18), the holder component (20) including a first fastening element (22) and a second fastening element (24) offset in the axial direction (A) for fastening on the vehicle part (18),
   wherein the holder component (20) has a lever support (30) adapted to be in contact with the vehicle part (18) and being arranged in the axial direction (A) between the first and second fastening elements (22, 24) and separating the holder component (20) into a first lever arm (32) and into a second lever arm (34), and wherein the first fastening element (22) is in the form of a hook (26) allowing a positive connection to the vehicle part (18).

2. A fastening device (16) for a tubular inflator (14) on a vehicle part (18), comprising a holder component (20) to which the inflator (14) can be fastened and which includes a first fastening element (22) and a second fastening element (24) offset in the axial direction (A) for fastening on the vehicle part (18),
   wherein the holder component (20) has a lever support (30) adapted to be in contact with the vehicle part (18) and being arranged in the axial direction (A) between the first and second fastening elements (22, 24) and separating the holder component (20) into a first lever arm (32) and into a second lever arm (34), and wherein the first fastening element (22) is in the form of a hook (26) allowing a positive connection to the vehicle part (18),
   wherein in the mounting condition the first fastening element (22) at the first lever arm (32) is biased via the lever support (30) by the second fastening element (24) at the second lever arm (34) and/or the second fastening element (24) is biased via the lever support (30) by the first fastening element (22).

3. The fastening device (16) according claim 1, wherein the holder component (20) is formed to be at least partly elastic and is biased in the mounting condition by the first and/or second fastening element (22, 24).

4. The fastening device (16) according to claim 1, wherein the holder component (20) is made of a formed sheet metal.

5. The fastening device (16) according to claim 1, wherein the second fastening element (24) is a screwed connection (28).

6. A fastening device (16) for a tubular inflator (14) on a vehicle part (18), comprising a holder component (20) to which the inflator (14) can be fastened and which includes a first fastening element (22) and a second fastening element (24) offset in the axial direction (A) for fastening on the vehicle part (18),
   wherein the holder component (20) has a lever support (30) adapted to be in contact with the vehicle part (18) and being arranged in the axial direction (A) between the first and second fastening elements (22, 24) and separating the holder component (20) into a first lever arm (32) and into a second lever arm (34), and wherein the first fastening element (22) is in the form of a hook (26) allowing a positive connection to the vehicle part (18) wherein
   the first fastening element (22) comprises a hook (26) formed by a nut (50) screwed onto a threaded bolt (48) of the inflator (14) including a head portion (52) and a tapered neck portion (54) allowing a positive connection to the vehicle part (18).

7. The fastening assembly (38) according to claim 1, wherein the nut (50) is T-shaped and includes a head portion (52) and a tapered neck portion (54).

8. The fastening assembly (38) according to claim 7, wherein the threaded bolt (48) protrudes through an opening of the holder component (20) and the holder component (20) is loaded against the inflator (14) by the neck portion (54).

9. The fastening assembly (38) according to claim 7, wherein a sealing (60) is provided between the holder component (20) and the inflator (14).

10. The fastening assembly (38) according to claim 7, wherein the hook (26) is formed so as to be adapted to be introduced into a keyhole-type opening (36) in the vehicle part (18) having a wide opening area and a tapered opening area, the maximum outer radius of the head portion (52) being smaller than or equal to the radius of the wider opening area and larger than or equal to the radius of the tapered opening area and the radius of the neck portion (54) being smaller than or equal to the radius of the tapered opening area.

11. The fastening assembly (38) according to claim 7, wherein the threaded bolt (48) is arranged in the area of the discharge orifices (40) of the inflator (14).

12. The fastening assembly (38) according to claim 7, wherein the nut (50) has an internal gearing (56).

13. (Previously Presented) A vehicle occupant restraint system (10) comprising an inflator (14) and an airbag (12) as well as a fastening device (16) according to claim 1.

14. A vehicle occupant restraint system (10) comprising an inflator (14) and an airbag (12) as well as a fastening assembly (38) according to claim 6.

\* \* \* \* \*